(12) United States Patent
Haertel et al.

(10) Patent No.: US 9,919,798 B2
(45) Date of Patent: Mar. 20, 2018

(54) SYSTEM FOR MOVING LOADS

(71) Applicant: Airbus Operations GmbH, Hamburg (DE)

(72) Inventors: Sven Haertel, Hamburg (DE); Volkhard Wendt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 416 days.

(21) Appl. No.: 14/195,574

(22) Filed: Mar. 3, 2014

(65) Prior Publication Data
US 2014/0255137 A1  Sep. 11, 2014

(30) Foreign Application Priority Data

Mar. 6, 2013 (DE) .......................... 10 2013 003 849

(51) Int. Cl.
*B64D 9/00* (2006.01)
*B60P 1/52* (2006.01)

(52) U.S. Cl.
CPC .................. *B64D 9/00* (2013.01); *B60P 1/52* (2013.01); *B64D 2009/006* (2013.01)

(58) Field of Classification Search
CPC ....... B60P 1/52; B64D 9/00; B64D 2009/006; B64C 1/20
See application file for complete search history.

(56) References Cited

U.S. PATENT DOCUMENTS

| | | | | |
|---|---|---|---|---|
| 2,693,286 A | * | 11/1954 | Cocks ....................... | B60P 1/52 29/256 |
| 3,642,154 A | | 2/1972 | Duszka | |
| 3,899,092 A | * | 8/1975 | Nordstrom ................ | B60P 1/52 244/137.1 |
| 3,905,494 A | * | 9/1975 | Yatagai ..................... | B60P 1/36 198/813 |

(Continued)

FOREIGN PATENT DOCUMENTS

| | | |
|---|---|---|
| DE | 19712278 | 9/1998 |
| DE | 10040181 | 5/2001 |
| EP | 1527993 | 5/2005 |

OTHER PUBLICATIONS

German Search Report, dated Dec. 19, 2013.

*Primary Examiner* — Glenn F Myers
(74) *Attorney, Agent, or Firm* — Greer, Burns & Crain, Ltd.

(57) ABSTRACT

A system for moving loads including a cargo compartment floor into which there is integrated at least one roller conveyor permitting displacement of a load in a direction parallel to a surface of said cargo compartment floor. The system also comprises a transport vehicle comprising a drive system and a platform movable between a first operating position and a second operating position. In its first operating position, the platform is arranged such that the transport vehicle is positionable under a load which is supported on the roller conveyor integrated into the cargo compartment floor. In its second operating position, the platform is (Continued)

arranged such that the load is entrained when a movement of the transport vehicle occurs in a direction parallel to the surface of the cargo compartment floor, and is displaced on the roller conveyor integrated into said cargo compartment floor.

20 Claims, 2 Drawing Sheets

(56) References Cited

U.S. PATENT DOCUMENTS

| | | | | |
|---|---|---|---|---|
| 4,000,870 A | * | 1/1977 | Davies | B64D 9/003 244/137.1 |
| 4,089,399 A | * | 5/1978 | Webb | B65G 13/12 193/35 SS |
| 4,388,030 A | * | 6/1983 | Skaale | B64D 9/003 244/118.1 |
| 5,101,962 A | * | 4/1992 | Pritchard | B64C 1/20 198/369.4 |
| 5,374,151 A | * | 12/1994 | Matthews | B65G 67/20 414/343 |
| 5,646,507 A | * | 7/1997 | Timmons | B60L 11/1816 320/109 |
| 6,193,453 B1 | * | 2/2001 | Kernkamp | B64D 9/003 410/77 |
| 7,344,013 B2 | * | 3/2008 | Krueger | B64D 9/00 193/35 R |
| 7,695,235 B1 | * | 4/2010 | Rallis | B65G 1/02 414/280 |
| 8,939,402 B2 | * | 1/2015 | Barmichev | B64C 1/20 244/118.1 |
| 9,056,577 B2 | * | 6/2015 | Corrigan | B60P 1/38 |
| 2005/0042068 A1 | * | 2/2005 | Ehmen | B66F 9/10 414/661 |
| 2009/0304482 A1 | * | 12/2009 | Sanford | B64D 9/00 414/495 |

* cited by examiner

SYSTEM FOR MOVING LOADS

CROSS-REFERENCES TO RELATED APPLICATIONS

This application claims the benefit of the German patent application No. 10 2013 003 849.9 filed on Mar. 6, 2013, the entire disclosures of which are incorporated herein by way of reference.

BACKGROUND OF THE INVENTION

The invention relates to a system for moving loads which is particularly suitable for use in a cargo compartment of an aircraft. The invention also relates to a cargo compartment which is equipped with a system of this kind.

Loads which are to be transported in cargo or passenger aircraft are usually stored in standardized containers or on standardized pallets, so-called "Unit Load Devices" (ULD's). In order to be able to displace the ULD's within the cargo compartment of the aircraft, there are usually integrated into a floor of said cargo compartment roller conveyors which, according to their design, permit movement of the ULD's in a manner dependent upon, or independent of, direction. A cargo compartment which is equipped with roller conveyors of this kind is described, for example, in EP 1 527 993 B1. The ULD's can be displaced manually on the roller conveyors. As an alternative to this, there may be provided, in or next to the roller conveyors, an electric drive system with power drive units (PDU's) which permits automatic displacement of the ULD's within the cargo compartment.

SUMMARY OF THE INVENTION

The underlying object of the invention is to make available a system for moving loads which is of simple construction and is particularly suitable for use in a cargo compartment of an aircraft and which permits convenient displacement of ULD's within said cargo compartment. The underlying object of the invention is also to indicate a cargo compartment equipped with a system of this kind.

A system for moving loads which is particularly suitable for use in a cargo compartment of a means of transport, such as an aircraft for example, but which can also be used in a stationary storage space, such as a storage building for example, comprises a cargo compartment floor. Integrated into the cargo compartment floor is at least one roller conveyor which permits displacement of a load in a direction parallel to a surface of said cargo compartment floor. The roller conveyor may comprise a plurality of rollers which may have any desired shape, such as a cylindrical or spherical shape for example, but which are each rotatably mounted in such a way that a load which is supported on the rollers of the roller conveyor can be displaced in a direction parallel to the surface of the cargo compartment floor.

The rollers of the roller conveyor are preferably so dimensioned that a load which is supported on the rollers of said roller conveyor is at a sufficient distance from the surface of the cargo compartment floor to permit friction-free displacement of the load parallel to the surface of said cargo compartment floor. For example, the rollers of the roller conveyor may be so dimensioned that the base plate of a load which is supported on the rollers of said roller conveyor is at a distance of about 40 to 50 mm, preferably about 45 mm, from the surface of the cargo compartment floor. Said cargo compartment floor may comprise any suitable material, for example a metal or a plastic material, preferably a fiber-reinforced plastic material. All that is essential is that the cargo compartment floor has a mechanical load-bearing capacity which is adapted to the weight and form of the loads which are intended for transport in a cargo compartment equipped with said cargo compartment floor. The loads in question may be standardized containers or standardized pallets, i.e., ULD's, but may also be any other loads.

The system for moving loads also comprises a transport vehicle which comprises a drive system and a platform which is movable between a first operating position and a second operating position. Said drive system serves to propel the transport vehicle. In its first operating position, the platform is arranged in such a way that the transport vehicle is positionable under a load which is supported on the roller conveyor integrated into the cargo compartment floor, i.e., on the rollers of said roller conveyor. In other words, when the platform of the transport vehicle is located in its first operating position, it is possible to drive the transport vehicle under the base plate of the load which is held at a distance from the surface of the cargo compartment floor by the rollers of the roller conveyor, and to position said transport vehicle in a desired position.

In its second operating position, on the other hand, the platform of the transport vehicle is arranged in such a way that the load is entrained when a movement of the transport vehicle occurs in a direction parallel to the surface of the cargo compartment floor, and is displaced on the roller conveyor integrated into said cargo compartment floor. What is essential about this is that the weight of the load is not borne by the transport vehicle, even when the platform of the latter is in its second operating position. Instead, the load remains supported on the rollers of the roller conveyor. The transport vehicle merely serves to apply to the load the force required for displacement of the latter over the roller conveyor integrated into the cargo compartment floor. Consequently, the transport vehicle does not need to be capable of bearing the load to be displaced parallel to the surface of the cargo compartment floor, and can therefore be embodied in a distinctly lighter and more cost-effective way than a transport vehicle which has to bear the full weight of a load when the latter is displaced.

The system for moving loads is distinguished by its simple construction and can therefore be produced in a particularly lightweight and cost-effective manner. The transport vehicle makes manual displacement of loads within a cargo compartment equipped with the system for moving loads superfluous, without it being necessary to equip said cargo compartment with an expensive and complex electric drive system with power drive units (PDU's) in or next to the roller conveyors. In addition to this, a cargo compartment which is already equipped with a cargo compartment floor having a roller conveyor integrated into it can easily be retrofitted with an above-described transport vehicle in order to equip said cargo compartment with the system for moving loads and to achieve the above-mentioned advantages. The system for moving loads is particularly well suited for use in a cargo compartment of a means of transport, such as an aircraft for example, since it is not necessary to leave the transport vehicle in said cargo compartment. Instead, the transport vehicle can be used for loading and unloading the cargo compartment and then removed from the latter again. It is thereby possible to utilize the useful load of the cargo compartment completely for loads which are to be transported in said cargo compartment.

The platform of the transport vehicle may be provided with a first retaining device which is adapted to interact with a complementary second retaining device provided on the base plate of a load, in order to connect the transport vehicle to said base plate of the load. For example, the first and second retaining devices may comprise complementary projections which extend from the platform of the transport vehicle and from the base plate of the load, respectively, and come into engagement with one another when said transport vehicle is positioned under the load in a suitable manner. As a result of the interaction of the first and second retaining devices it is possible to ensure that the load is entrained when a movement of the transport vehicle occurs in a direction parallel to the surface of the cargo compartment floor, and is accordingly displaced on the roller conveyor integrated into said cargo compartment floor.

As an alternative to this, however, the platform of the transport vehicle may also be adapted to press, in its second operating position, against the base plate of the load with a contact pressure such that the frictional forces that occur between the platform and the base plate of the load in the process are sufficiently great to guarantee that the load is entrained when a movement of the transport vehicle occurs in a direction parallel to the surface of the cargo compartment floor, and is displaced on the roller conveyor integrated into said cargo compartment floor. Such a configuration of the transport vehicle has the advantage that it can be used universally and it is possible to dispense with special adaptation of the loads which are to be displaced with the aid of said transport vehicle. In principle, it is conceivably possible to equip the transport vehicle with a platform, the contact pressure of which against the base plate of the load to be displaced can be varied, for example in dependence upon the weight of said load. As an alternative to this, however, it is also conceivable to design the transport vehicle in such a way that, in its second operating position, the platform applies a uniform contact pressure to the base plate of a load under which said transport vehicle is positioned in a desired position.

A lifting mechanism for moving the platform of the transport vehicle between its first operating position and its second operating position may be constructed in the form of a pneumatic, hydraulic or electric lifting mechanism. As has been stated above, the lifting mechanism may be adapted to produce, for example under the control of a suitable control unit, a variable contact pressure of the platform against the base plate of the load, which contact pressure may depend, for example, upon the weight of a load which is to be moved with the aid of the transport vehicle. As an alternative to this, however, the lifting mechanism may merely be adapted to raise the platform out of its first operating position into its second operating position, so that said platform applies a substantially constant contact pressure to the base plate of the load which is to be moved.

In one preferred embodiment of the system for moving loads, a lifting mechanism for moving the platform of the transport vehicle between its first operating position and its second operating position comprises a connecting arrangement, which is movable between a first operating position and a second operating position, for connecting the drive system to the platform. In its first operating position, said connecting arrangement may be positioned in such a way, relative to the drive system, that the platform is located in its first operating position. In its second operating position, on the other hand, the connecting arrangement may be positioned in such a way, relative to the drive system, that the platform is located in its second operating position. For example, the lifting mechanism may comprise a connecting arrangement which connects the platform of the transport vehicle to a wheel axle of the drive system and which raises the platform, relative to the wheel axle, when moved out of its first operating position into its second operating position, or which lowers the platform, relative to said wheel axle, when moved out of its second operating position into its first operating position.

A plurality of roller conveyors may be integrated into the cargo compartment floor of the system for moving loads. The transport vehicle may also be so dimensioned that it is positionable between two roller conveyors which are arranged, for example, substantially parallel to one another. For example, a transport vehicle which is suitable for use in combination with a cargo compartment floor which is provided with roller conveyors arranged at a distance of about 500 mm from one another may have a width of about 400 mm.

The drive system of the transport vehicle may comprise a wheel mechanism. For example, said drive system may be equipped with a wheel mechanism which comprises wheels which are arranged in the region of two mutually opposed lateral faces of the platform. If desired, a number of wheels which are arranged one behind another in the direction of a longitudinal axis of the transport vehicle may be provided in the region of two mutually opposed lateral faces of the platform. If the wheel mechanism comprises a number of wheels which are arranged one behind another in the direction of the longitudinal axis of the transport vehicle, the local pressure per unit of area exerted by the transport vehicle on the cargo compartment floor is lower, because of the larger area of contact between the wheels of the transport vehicle and the surface of the cargo compartment floor, than in the case of a transport vehicle in which the wheel mechanism comprises only two wheels. The design of the drive system can thus be easily adapted to the carrying capacity of the cargo compartment floor.

As an alternative to this, it is conceivable to equip the drive system of the transport vehicle with a roller mechanism wherein the rollers may extend, depending upon the carrying capacity of the cargo compartment floor, over only part of the width, or over the entire width, of the transport vehicle. The number of rollers of the roller mechanism may also be varied as required, depending upon the carrying capacity of the cargo compartment floor. The lifting mechanism of a transport vehicle having a drive system with a roller mechanism may be constructed in the form of a pneumatic, hydraulic or electric lifting mechanism or comprise a connecting arrangement, which is movable between a first operating position and a second operating position, for connecting the drive system to the platform. In particular, a setting-up mechanism may be provided for raising the platform, relative to the rollers.

As an alternative to this, it is conceivable to provide the drive system of the transport vehicle with a chain mechanism. Because of the further increase in the area of contact between the chain mechanism of the transport vehicle and the surface of the cargo compartment floor, a chain mechanism permits a further reduction in the local pressure per unit of area exerted by the transport vehicle on the cargo compartment floor.

Depending upon requirements, the cargo compartment floor may also be equipped with a reinforcing element for improving its mechanical load-bearing capacity. Since this increases the weight of the cargo compartment floor, however, the use of a reinforcing element should only be considered if no adequate reduction in the loads acting upon said cargo compartment floor is possible by designing the drive system of the transport vehicle in a suitable manner.

The drive system of the transport vehicle preferably comprises an electric driving motor. A transport vehicle equipped with an electric driving motor can be used in an enclosed space, such as the cargo compartment of a means of transport for example, without any problems.

The drive system of the transport vehicle may comprise a battery for storing electrical energy or a contact-less current-transmitting system. The electric driving motor of the transport vehicle may be supplied with electrical energy by the battery or the contact-less current-transmitting system.

The system for moving loads may also comprise a docking station which is adapted to be connected to the drive system of the transport vehicle in order to feed electrical energy to a battery belonging to said drive system. The docking station may be arranged outside the cargo compartment and be connected to the transport vehicle, for example after the latter has been removed from the cargo compartment after said cargo compartment has been loaded or unloaded.

In one preferred embodiment, the system for moving loads comprises a remote control arrangement which is adapted to transmit control signals for controlling the drive system and/or for positioning the platform to a receiving arrangement of the transport vehicle. With the aid of the remote control arrangement, the operation of said transport vehicle can consequently be controlled in a particularly simple and convenient manner.

However, the transport vehicle may also be equipped with a handle. Said handle may, for example, be fastened to the platform and simplifies manual displacement of the transport vehicle, should this be desired or necessary.

In one preferred embodiment of the system for moving loads, the transport vehicle comprises a remote control arrangement which is adapted to control the operation of the transport vehicle in such a way that the latter is moved from a predetermined starting position under a load which is arranged in a first predetermined position. When the transport vehicle is positioned under the load, the control arrangement may control the platform of the transport vehicle in such a way that said platform is moved from its first operating position into its second operating position and comes into contact with the base plate. The control arrangement may then control the transport vehicle in such a way that the latter is moved in a direction parallel to the surface of the cargo compartment floor. Since the platform of the transport vehicle is located in its second operating position, the load is entrained and displaced, on the roller conveyor integrated into the cargo compartment floor, into a second predetermined position.

When the load is arranged in the second predetermined position, the platform of the transport vehicle may be moved back from its second operating position into its first operating position again under the control of the control arrangement, so that said platform is detached from the base plate of the load again and the transport vehicle can be moved freely under the load again. Finally, the control arrangement may control the transport vehicle in such a way that the latter is moved back into the predetermined starting position.

Such a configuration of the system for moving loads permits automatic operation of said system, and consequently automatic loading and unloading of a cargo compartment which is equipped with the system for moving loads. The control arrangement is preferably constructed in the form of an electronic control arrangement which may be equipped with suitable control software for controlling the operation of the transport vehicle. If changes in the operation of said transport vehicle are necessary, these can then be implemented without major outlay by changing the control software accordingly.

The control arrangement may be adapted to control the operation of the transport vehicle in dependence upon the signals from at least one sensor for detecting obstacles in a path of motion of said transport vehicle. This prevents said transport vehicle from colliding with, or running over, obstacles when it is operating automatically.

A cargo compartment according to the invention is equipped with an above-described system for moving loads.

An above-described system for moving loads and/or an above-described cargo compartment can be used particularly advantageously in an aircraft.

BRIEF DESCRIPTION OF THE DRAWINGS

Preferred embodiments of the invention will now be explained in greater detail with the aid of the appended diagrammatic drawings, in which.

DETAILED DESCRIPTION OF THE PREFERRED EMBODIMENTS

Figure 1:
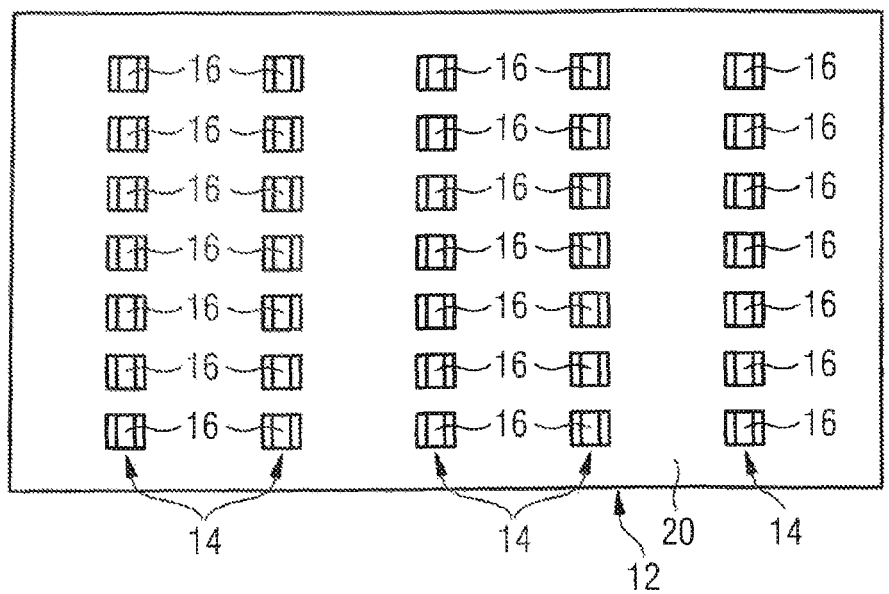
FIG. 1 shows a top view of a cargo compartment floor, into which there is integrated a plurality of roller conveyors for displacing a load in a direction parallel to a surface of said cargo compartment floor which are arranged substantially parallel to one another.
Figure 2:
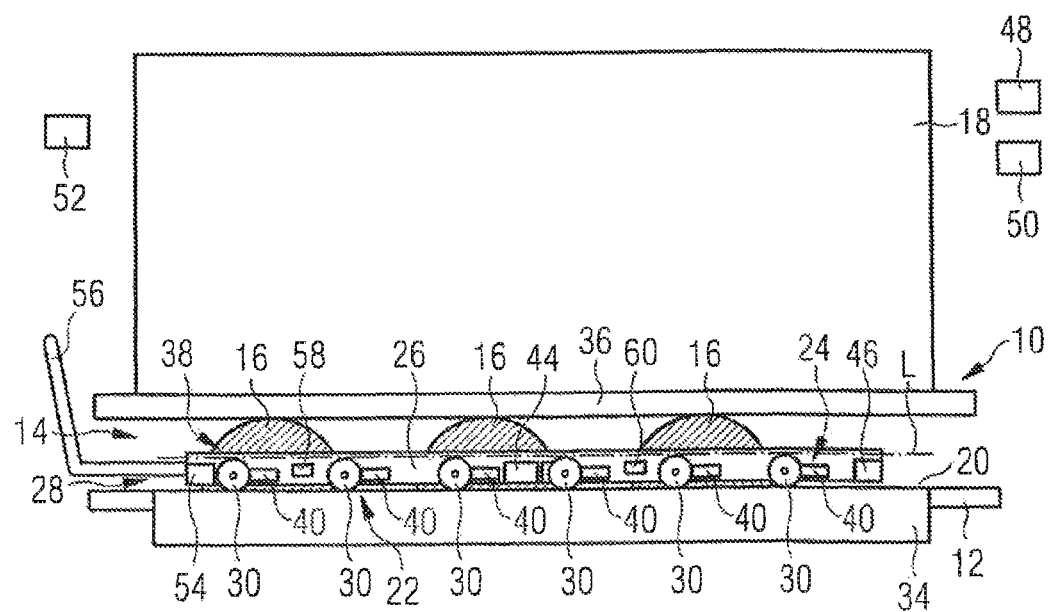
FIG. 2 shows a system for moving loads which comprises the cargo compartment floor according to FIG. 1 and a transport vehicle, a platform of said transport vehicle being located in a first operating position so that the transport vehicle can be positioned under a load which is supported on the roller conveyors of the cargo compartment floor according to FIG. 1.
Figure 3:
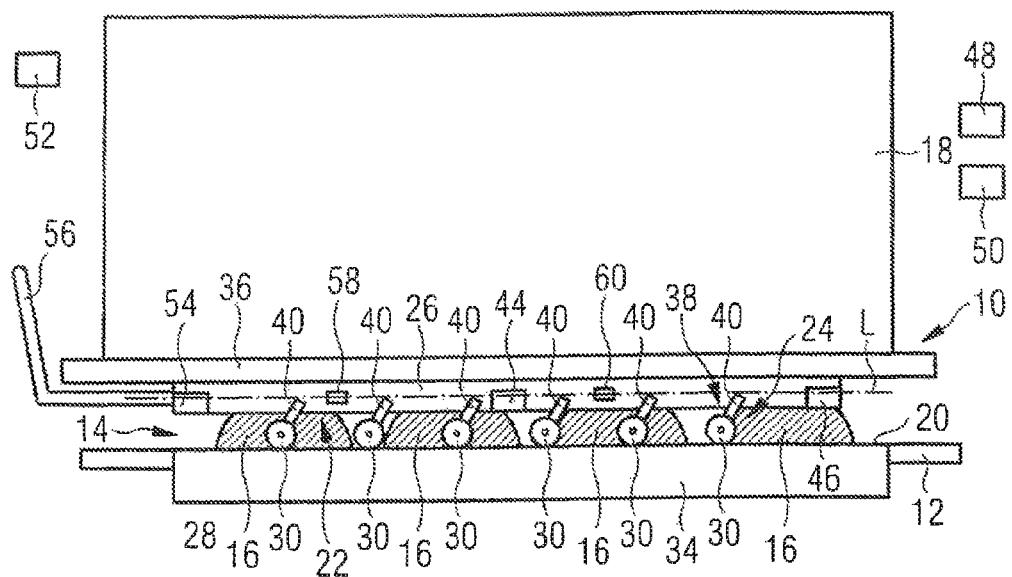
FIG. 3 shows the system for moving loads according to FIG. 2, the platform of the transport vehicle being located in its second operating position so that the load which is supported on the roller conveyors of the cargo compartment floor according to FIG. 1 is entrained when a movement of the transport vehicle occurs in a direction parallel to the surface of the cargo compartment floor, and is displaced on the roller conveyors integrated into said cargo compartment floor.
Figure 4:
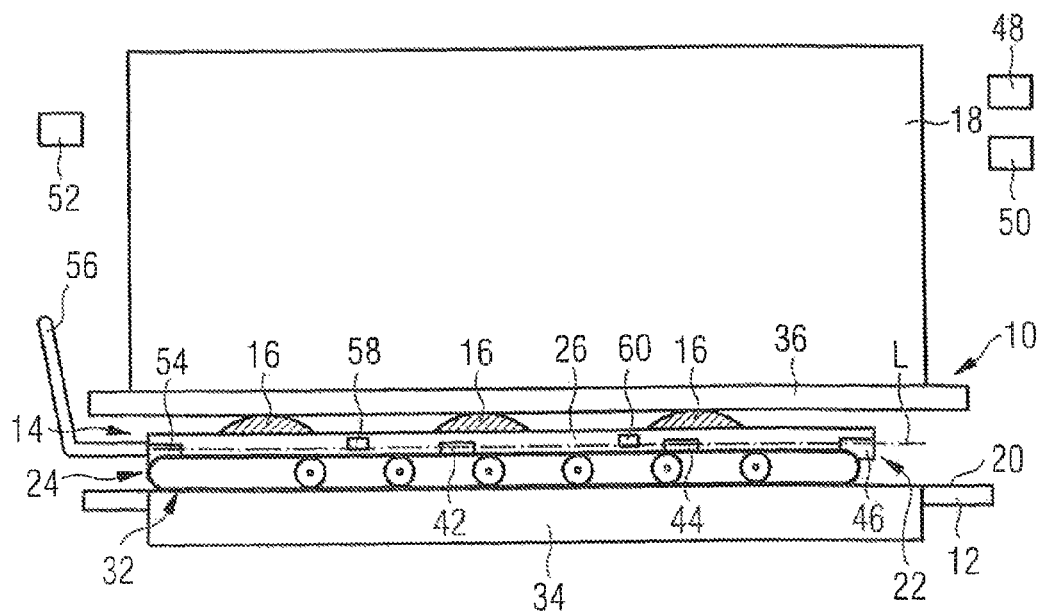
FIG. 4 shows an alternative embodiment of a system for moving loads which comprises a transport vehicle with a drive system having a chain mechanism.

A system 10, which is illustrated in FIGS. 2 to 4, for moving loads 18 within a cargo compartment, in particular a cargo compartment of a means of transport, such as an aircraft for example, comprises a cargo compartment floor 12 which is illustrated in greater detail in FIG. 1. Integrated into said cargo compartment floor 12 is a plurality of roller conveyors 14 which are arranged substantially parallel to one another. Each roller conveyor is formed by a plurality of rotatably mounted rollers 16. Loads 18 (see FIGS. 2 to 4) which are intended to be received within the cargo compartment may be supported on the rollers 16 of the roller conveyors 14.

The rotatably mounted rollers 16 of the roller conveyors 14 permit displacement of the loads 18 in a direction parallel to the surface 20 of the cargo compartment floor 12. Of course, said cargo compartment floor 12 may be equipped with any desired number of roller conveyors 14 extending in any desired directions, in order to permit, depending upon requirements, displacement of the loads 18 in any desired directions parallel to the surface 20 of the cargo compartment floor 12. In addition or as an alternative to this, the rollers 16 may be embodied in the form of spherical rollers, which likewise permit particularly flexible displaceability of the loads 18 in any desired directions parallel to the surface 20 of the cargo compartment floor 12.

The system 10 also comprises a transport vehicle 22 which is illustrated in FIGS. 2 to 4. Said transport vehicle 22 comprises a drive system 24 and a platform 26. In the embodiment of the transport vehicle 22 shown in FIGS. 2 and 3, the drive system 24 of the transport vehicle 22 which serves to move said transport vehicle 22 over the surface 20 of the cargo compartment floor 12 has a wheel mechanism 28. Said wheel mechanism 28 comprises a plurality of wheels 30 which are arranged one behind another along a longitudinal axis L of the transport vehicle 22. In particular, the drive system 24 is provided with two rows of wheels 30 (only one row of wheels 30 is shown in FIGS. 2 and 3) which are arranged along lateral faces of the platform 26.

In the embodiment of a system 10 for moving loads which is shown in FIG. 4, on the other hand, the transport vehicle 22 comprises a drive system 24 which is equipped with a chain mechanism 32. The design of said drive system 24 of the transport vehicle 22 may be adapted to the requirements that are imposed upon said transport vehicle 22 during operation, in particular the dimensions and weight of the loads 18 which are intended to be received within the cargo compartment and also the design, in particular the mechanical load-bearing capacity, of the cargo compartment floor 12. For example, a wheel mechanism 30 should comprise the more wheels 30, the lower the local load-bearing capacity per unit of area of the cargo compartment floor 12. The pressure exerted by the transport vehicle 22 upon the cargo compartment floor 12 becomes still lower if said transport vehicle 22 is provided, as shown in FIG. 4, with a drive system 24 having a chain mechanism 32.

The cargo compartment floor 12 may optionally be provided with a reinforcing element 34, which is shown in FIG. 2 to 4, or a plurality of reinforcing elements 34, for improving the mechanical load-bearing capacity of said cargo compartment floor 12. The reinforcing element or elements 34 may be particularly provided in those regions of the cargo compartment floor 12 over which the transport vehicle 22 runs.

The platform 26 of the transport vehicle 22 can be moved between a first operating position, which is shown in FIG. 2, and a second operating position, which is illustrated in FIG. 3. In its first operating position, the platform 26 is arranged in such a way that the transport vehicle 22 can be positioned under a load 18 which is supported on the roller conveyors 14 integrated into the cargo compartment floor 12. For example, the rollers 16 of the roller conveyors 14 may maintain a base plate 36 of the load 18 at a distance of about 45 mm from the surface 20 of the cargo compartment floor 12. When the platform 26 is located in its first operating position, the transport vehicle 22 then has a total height of, for example, about 35 to 40 mm, so that it can be positioned under the load 18 without any problems.

In its second operating position, on the other hand, the platform 26 is arranged in such a way that the load 18 is entrained when a movement of the transport vehicle 22 occurs in a direction parallel to the surface 20 of the cargo compartment floor 12, and is displaced on the roller conveyors 14 integrated into said cargo compartment floor 12. Even when the platform 26 of the transport vehicle 22 is located in its second operating position, the weight of the load 18 continues to be borne by the rollers 16 of the roller conveyors 14. In its second operating position, however, the platform 26 exerts a contact pressure on the base plate 36 of the load such that the frictional forces that occur between the platform 26 and the base plate 36 of the load 18 are sufficiently great to guarantee that the load 18 is entrained when a movement of the transport vehicle 22 occurs in a direction parallel to the surface 20 of the cargo compartment floor 12, and is displaced on the roller conveyors 14 integrated into said cargo compartment floor 12.

In addition to the height of the transport vehicle 22, its width is also adapted to the design of the cargo compartment floor 12. In particular, said transport vehicle 22 is so dimensioned that it is narrower than the distance between two mutually adjacent roller conveyors 14. For example, a transport vehicle 22 which is suitable for use in combination with a cargo compartment floor 12 which has roller conveyors 14 arranged at a distance of about 500 mm from one another may have a width of about 400 mm. This allows for the possibility of moving the transport vehicle 22 between two mutually adjacent roller conveyors 14 and under the load 18 supported on the rollers 16 of said roller conveyors 14.

A lifting mechanism 38 of the transport vehicle 22 serves for moving the platform 26 between its first operating position and its second operating position. The transport vehicle 22 illustrated in FIGS. 2 and 3 comprises a lifting mechanism 38 which comprises connecting arrangements 40, which can be moved between a first operating position (see FIG. 2) and a second operating position (see FIG. 3), for connecting the drive system 24 to the platform 26. In the exemplary embodiment illustrated in FIGS. 2 and 3, the connecting arrangements 40 are each connected to an axle of the wheels 30 and are pivotably articulated on a lateral wall of the platform 26. By tilting the connecting arrangements 40, the platform 26 can be raised out of its first operating position and into its second operating position, or lowered out of its second operating position and into its first operating position.

In the embodiment of a system 10 for moving loads 18 which is represented in FIG. 4, on the other hand, the transport vehicle 22 is equipped with a lifting mechanism 38 which comprises a lifting cylinder 42, which is represented only diagrammatically and which is pneumatically, hydraulically or electrically driven, for raising the platform 26 out of its first operating position and into its second operating position, or for lowering said platform 26 out of its second operating position and into its first operating position.

The drive system 24 of the transport vehicle 22 also comprises an electric driving motor 44 and a battery 46 which supplies said electric driving motor 44 with electrical energy. As an alternative to this, the electric driving motor 44 may also be supplied with electrical energy by a contactless current-transmitting system 48 which is represented diagrammatically in FIGS. 2 to 4. The system 10 for moving loads 18 also comprises a docking station 50 which is adapted to be connected to the drive system 24 of the transport vehicle 22 in order to feed electrical energy to the battery 46 of said drive system 24. For this purpose, the battery 46 and the docking station 50 are provided with suitable complementary connecting elements.

Finally, the system 10 comprises a remote control arrangement 52 which can be operated by an operator and which is adapted to transmit control signals for controlling the drive system 24 and/or for positioning the platform 26 to a receiving arrangement 54 of the transport vehicle 22. With the aid of the remote control arrangement 52 and the receiving arrangement 54, the operation of the transport vehicle 22 can be controlled in a contact-less manner, as desired. In addition to this, the transport vehicle 22 is provided with a handle 56 which facilitates manual movement of said transport vehicle 22 if necessary.

In order to also permit automatic loading or unloading of a cargo compartment equipped with the system 10, the transport vehicle 22 is also equipped with a control arrangement 58 which is adapted to control the operation of the transport vehicle 22 in such a way that the latter is moved from a predetermined starting position under a load 18 which is arranged in a first predetermined position. When the transport vehicle 22 is positioned under the load 18, the control arrangement 58 controls the platform 26 of the transport vehicle 22 in such a way that said platform 26 is moved from its first operating position into its second operating position. The control arrangement 58 then controls the transport vehicle 22 in such a way that the latter is moved in a direction parallel to the surface 20 of the cargo compartment floor 12. In the process, the load 18 is entrained and displaced, on the roller conveyors 14 integrated into the cargo compartment floor 12, into a second predetermined position. When the load 18 is arranged in the second predetermined position, the platform 26 of the transport vehicle 22 is moved back from its second operating position into its first operating position again under the control of the control arrangement 58. Finally, said control arrangement 58 controls the transport vehicle 22 back into the predetermined starting position again.

Finally, the transport vehicle 22 comprises at least one sensor 60 for detecting obstacles in a path of motion of said transport vehicle 22. The control arrangement 58 controls the operation of the transport vehicle in dependence upon the signals transmitted to said control arrangement 58 by the sensor 60, i.e., the control arrangement 58 decelerates the movement of the transport vehicle 22 or changes the intended path of motion of said transport vehicle 22 in such a way that the latter is prevented from colliding with, or running over, obstacles when it is operating automatically.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for moving loads comprising:
a cargo compartment floor into which there is integrated at least one roller conveyor comprising a plurality of rollers which permit displacement of a load in a direction parallel to a surface of said cargo compartment floor, the at least one roller conveyor spanning at least one of a width dimension and a depth dimension of the cargo compartment floor so as to permit displacement of the load on the rollers of the at least one roller conveyor from a loading area of the cargo compartment floor in which the load is loaded onto the rollers of the at least one roller conveyor integrated into the cargo compartment floor to a desired transport position on the cargo compartment floor along a displacement direction of the at least one roller conveyor spanning the width dimension of the cargo compartment floor, the depth dimension of the cargo compartment floor, or both, and a transport vehicle which comprises a drive system and a platform which is movable between a first operating position and a second operating position,
wherein said platform is arranged, in its first operating position, in such a way that the transport vehicle is configured to be positioned under a load which is supported on the rollers of the roller conveyor integrated into the cargo compartment floor,
wherein said platform is arranged, in its second operating position, in such a way that the load is entrained when a movement of the transport vehicle occurs in a direction parallel to the surface of the cargo compartment floor, and is displaced on the rollers of the roller conveyor integrated into said cargo compartment floor such that an entirety of a weight of the load is not borne by the transport vehicle but at least a portion of the weight remains supported on the rollers of the roller conveyor, and
wherein the transport vehicle is supported on the cargo compartment floor in both the first operating position and the second operating position.

2. The system for moving loads according to claim 1, wherein the platform of the transport vehicle is adapted to press, in its second operating position, against a base plate of the load with a contact pressure such that the frictional forces that occur between the platform and the base plate of the load in the process are sufficiently great to guarantee that the load is entrained when a movement of the transport vehicle occurs in a direction parallel to the surface of the cargo compartment floor, and is displaced on the roller conveyor integrated into said cargo compartment floor.

3. The system for moving loads according to claim 1, wherein a lifting mechanism for moving the platform of the transport vehicle between its first operating position and its second operating position is constructed in the form of a pneumatic, hydraulic or electric lifting mechanism.

4. The system for moving loads according to claim 1, wherein a lifting mechanism for moving the platform of the transport vehicle between its first operating position and its second operating position comprises a connecting arrangement, which is movable between a first operating position and a second operating position, for connecting the drive system to the platform, said connecting arrangement being positioned, in its first operating position, in such a way, relative to the drive system, that the platform is located in its first operating position, and said connecting arrangement being positioned, in its second operating position, in such a way, relative to the drive system, that the platform is located in its second operating position.

5. The system for moving loads according to claim 1, wherein a plurality of roller conveyors is integrated into the cargo compartment floor, and that the transport vehicle is so dimensioned that it is positionable between two roller conveyors which are arranged substantially parallel to one another.

6. The system for moving loads according to claim 1, wherein the drive system of the transport vehicle comprises a wheel mechanism, a roller mechanism or a chain mechanism.

7. The system for moving loads according to claim 1, wherein the cargo compartment floor comprises a reinforcing element for improving the mechanical load-bearing capacity of said cargo compartment floor.

8. The system for moving loads according to claim 1, wherein the drive system of the transport vehicle comprises an electric driving motor.

9. The system for moving loads according to claim 1, wherein the drive system of the transport vehicle comprises a battery for storing electrical energy or a contact-less current-transmitting system.

10. The system for moving loads according to claim 1, further comprising a docking station which is adapted to be connected to the drive system of the transport vehicle in order to feed electrical energy to a battery of said drive system.

11. The system for moving loads according to claim 1, further comprising a remote control arrangement which is adapted to transmit control signals for controlling the drive system and/or for positioning the platform to a receiving arrangement of the transport vehicle.

12. The system for moving loads according to claim 1, wherein the transport vehicle comprises a handle.

13. The system for moving loads according to claim 1, wherein the transport vehicle comprises a control arrangement which is adapted to control the operation of said transport vehicle in such a way that:
the transport vehicle is moved from a predetermined starting position under a load which is arranged in a first predetermined position;
the platform of the transport vehicle is moved from its first operating position into its second operating position when said transport vehicle is positioned under the load;
the transport vehicle is moved in a direction parallel to the surface of the cargo compartment floor and, in the process, the load is entrained and displaced, on the roller conveyor integrated into the cargo compartment floor, into a second predetermined position;
the platform of the transport vehicle is moved back from its second operating position into its first operating position when the load is arranged in the second predetermined position; and
the transport vehicle is moved back into the predetermined starting position.

14. The system for moving loads according to claim 13, wherein the control arrangement is adapted to control the operation of the transport vehicle in dependence upon the signals from at least one sensor for detecting obstacles in a path of motion of said transport vehicle.

15. The system for moving loads according to claim 1, wherein said system is located in an aircraft.

16. The system for moving loads according to claim 1, wherein the transport vehicle is configured to move along the entire depth dimension of the cargo compartment floor.

17. The system for moving loads according to claim 1, wherein the drive system of the transport vehicle remains in constant contact with the cargo compartment floor.

18. A cargo compartment having a system for moving comprising:
a cargo compartment floor into which there is integrated at least one roller conveyor comprising a plurality of rollers which permit displacement of a load in a direction parallel to a surface of said cargo compartment floor, the at least one roller conveyor spanning at least one of a width dimension and a depth dimension of the cargo compartment floor so as to permit displacement of the load on the rollers of the at least one roller conveyor from a loading area of the cargo compartment floor in which the load is loaded onto the rollers of the at least one roller conveyor integrated into the cargo compartment floor to a desired transport position on the cargo compartment floor along a displacement direction of the at least one roller conveyor spanning the width dimension of the cargo compartment floor, the depth dimension of the cargo compartment floor, or both, and
a transport vehicle which comprises a drive system and a platform which is movable between a first operating position and a second operating position,
wherein said platform is arranged, in its first operating position, in such a way that the transport vehicle is configured to be positioned under a load which is supported on the rollers of the roller conveyor integrated into the cargo compartment floor,
wherein said platform is arranged, in its second operating position, in such a way that the load is entrained when a movement of the transport vehicle occurs in a direction parallel to the surface of the cargo compartment floor, and is displaced on the rollers of the roller conveyor integrated into said cargo compartment floor such that an entirety of a weight of the load is not borne by the transport vehicle but at least a portion of the weight remains supported on the rollers of the roller conveyor,
wherein the transport vehicle is supported on the cargo compartment floor in both the first operating position and the second operating position.

19. The cargo compartment according to claim 18, wherein said cargo compartment is located in an aircraft.

20. A method for moving loads with a system comprising:
a cargo compartment floor into which there is integrated at least one roller conveyor comprising a plurality of rollers which permit displacement of a load in a direction parallel to a surface of said cargo compartment floor, the at least one roller conveyor spanning at least one of a width dimension and a depth dimension of the cargo compartment floor so as to permit displacement of the load on the rollers of the at least one roller conveyor from a loading area of the cargo compartment floor in which the load is loaded onto the rollers of the at least one roller conveyor integrated into the cargo compartment floor to a desired transport position on the cargo compartment floor along a displacement direction of the at least one roller conveyor spanning the width dimension of the cargo compartment floor, the depth dimension of the cargo compartment floor, or both, and
a transport vehicle which comprises a drive system and a platform which is movable between a first operating position and a second operating position,
wherein said platform is arranged, in its first operating position, in such a way that the transport vehicle is configured to be positioned under a load which is supported on the rollers of the roller conveyor integrated into the cargo compartment floor, and
wherein said platform is arranged, in its second operating position, in such a way that an entirety of the weight of the load is not borne by the transport vehicle but at least a portion of weight remains supported on the rollers of the roller conveyor,
the method comprising the steps of:
moving the platform into its first operating position;
with the platform in the first operating position, moving the transport vehicle so as to position the platform under a load which is supported on the rollers of the roller conveyor integrated into the cargo compartment floor;
when positioned under said load, moving the platform into its second operating position;

with the platform in the second operating position, moving the transport vehicle in a direction parallel to the surface of the cargo compartment floor so as to entrain the load and displace same on the rollers of the roller conveyor, and wherein the transport vehicle is supported on the cargo compartment floor in both the first operating position and the second operating position.

* * * * *